No. 851,123. PATENTED APR. 23, 1907.
J. E. ERICKSON.
MORTISE AND TENON SAWING MACHINE.
APPLICATION FILED JAN. 4, 1907.

7 SHEETS—SHEET 1.

Witnesses:
Theo. Lagaard
H. A. Bowman.

Inventor
John E. Erickson
By P. H. Gunckel
his Attorney.

No. 851,123. PATENTED APR. 23, 1907.
J. E. ERICKSON.
MORTISE AND TENON SAWING MACHINE.
APPLICATION FILED JAN. 4, 1907.

7 SHEETS—SHEET 2.

Witnesses:
Thos. Lagaard.
H. A. Bowman.

Inventor;
John E. Erickson.
By P. H. Gunckel
his Attorney.

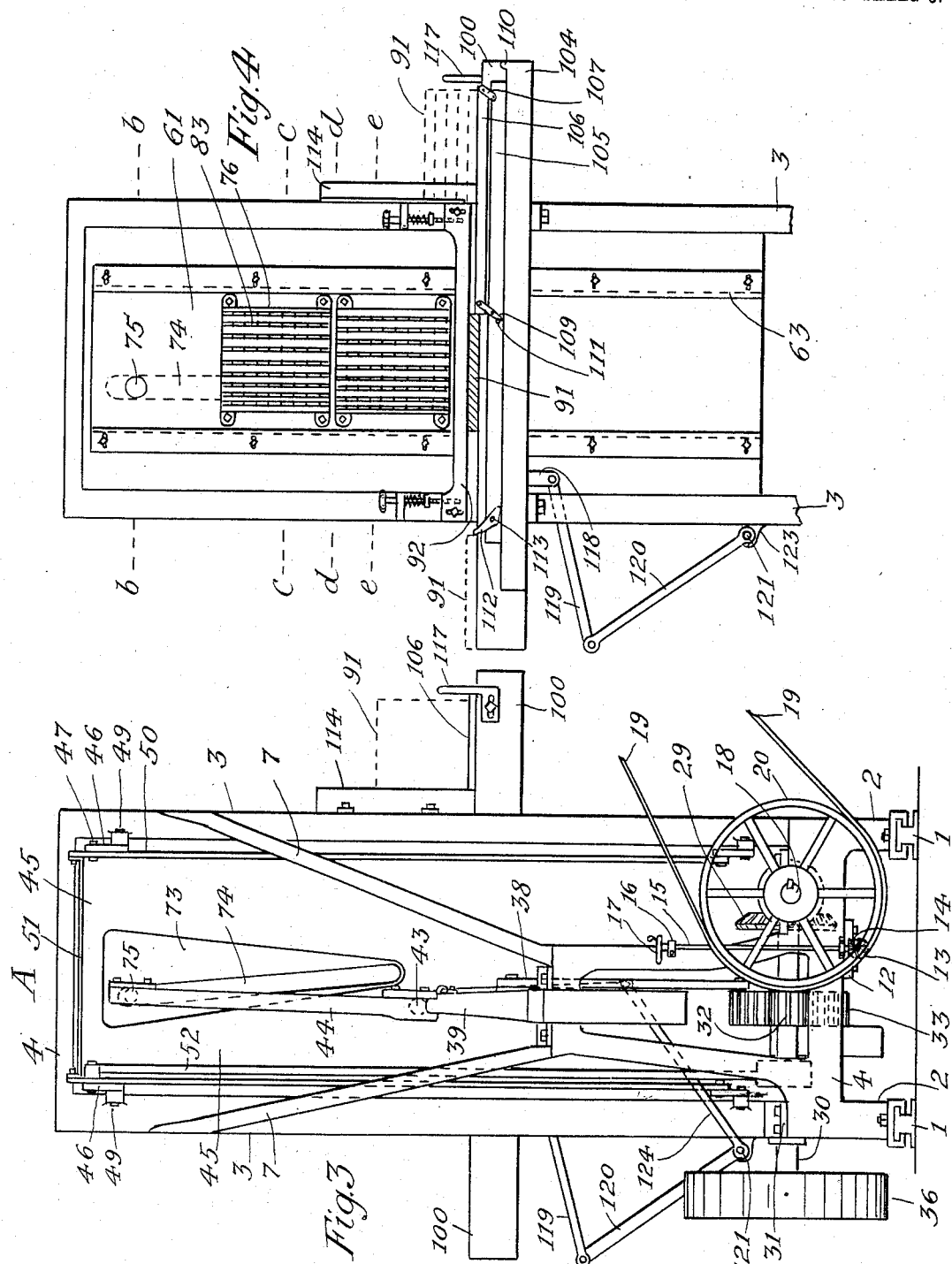

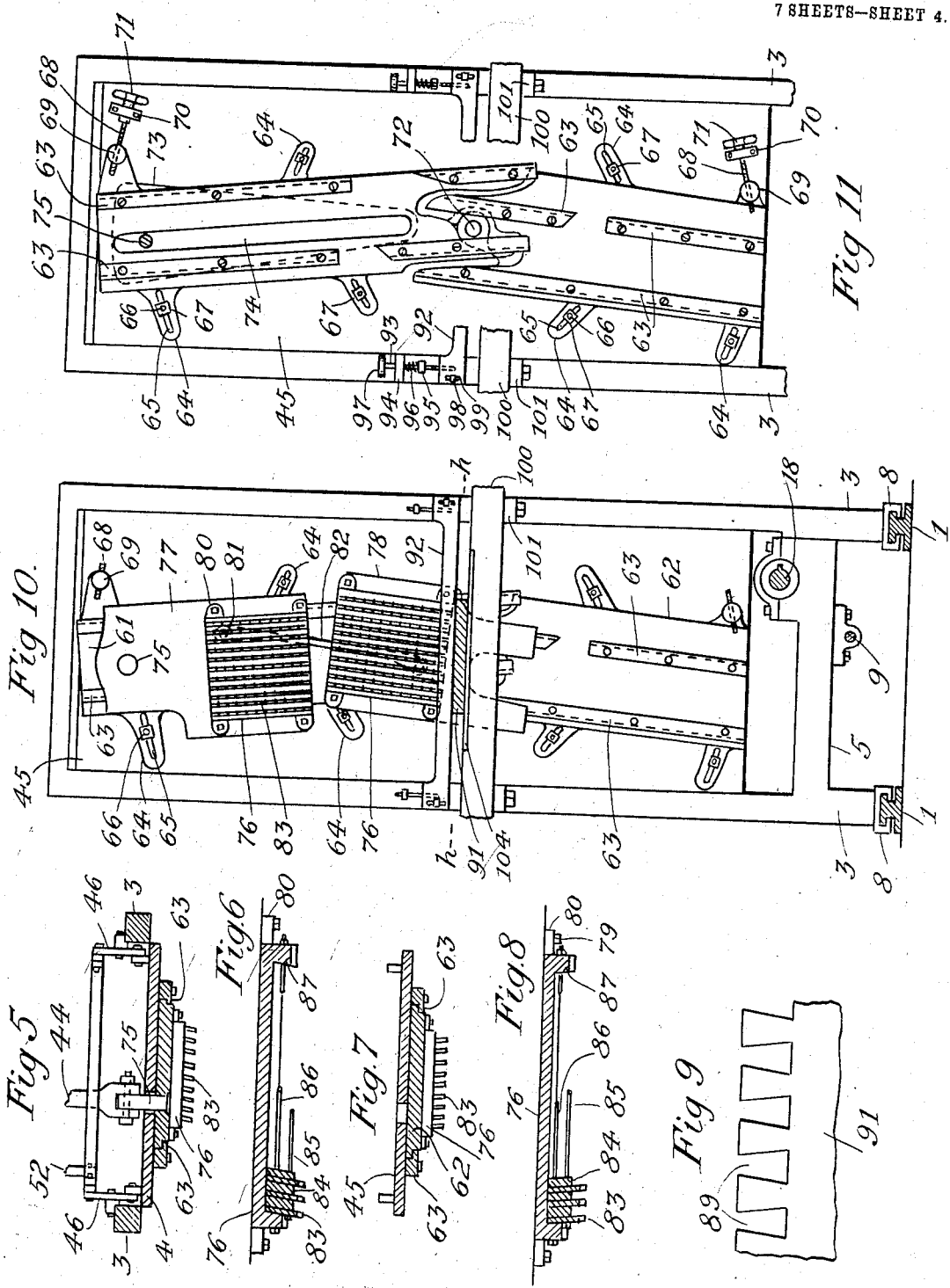

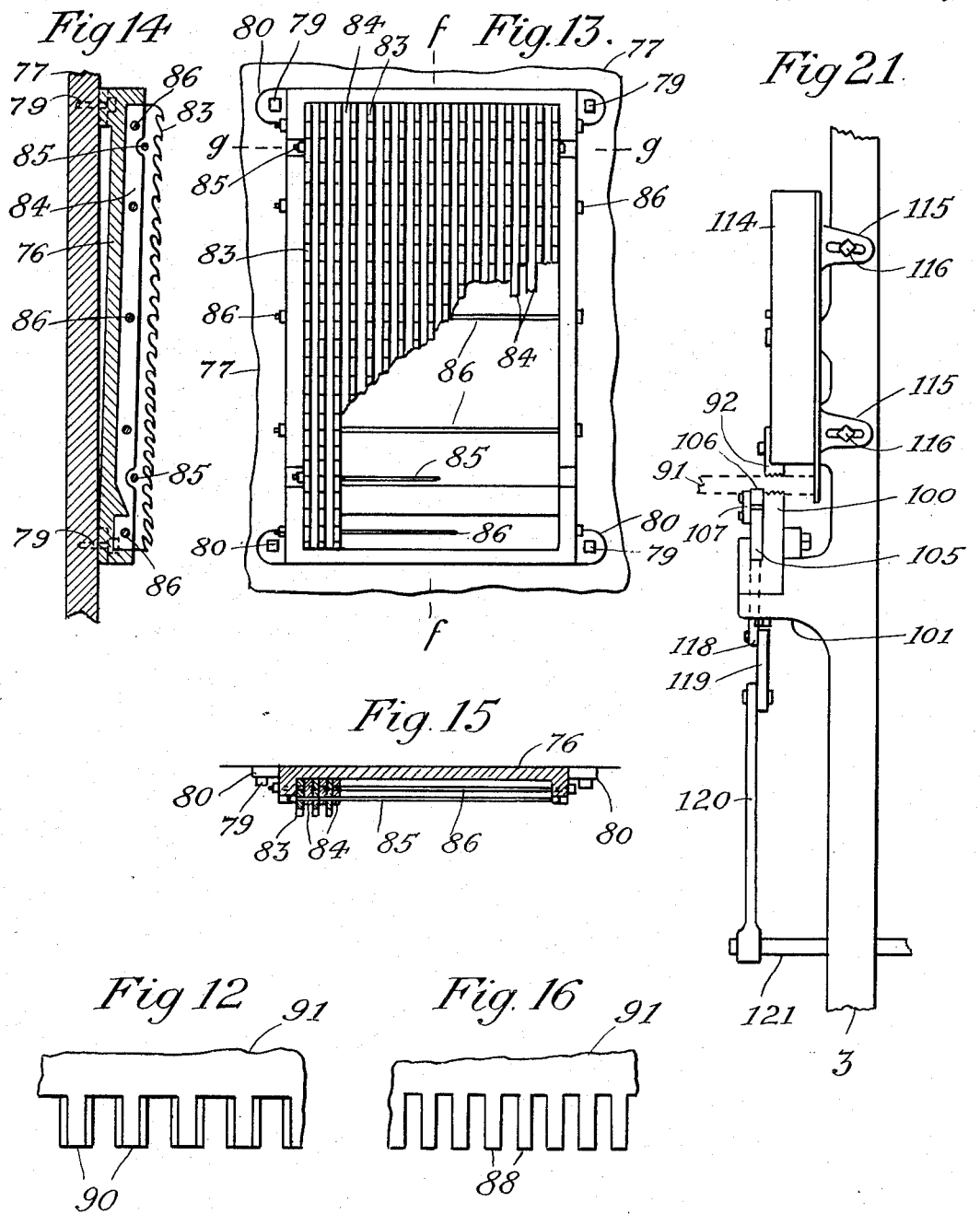

No. 851,123. PATENTED APR. 23, 1907.
J. E. ERICKSON.
MORTISE AND TENON SAWING MACHINE.
APPLICATION FILED JAN. 4, 1907.
7 SHEETS—SHEET 6.
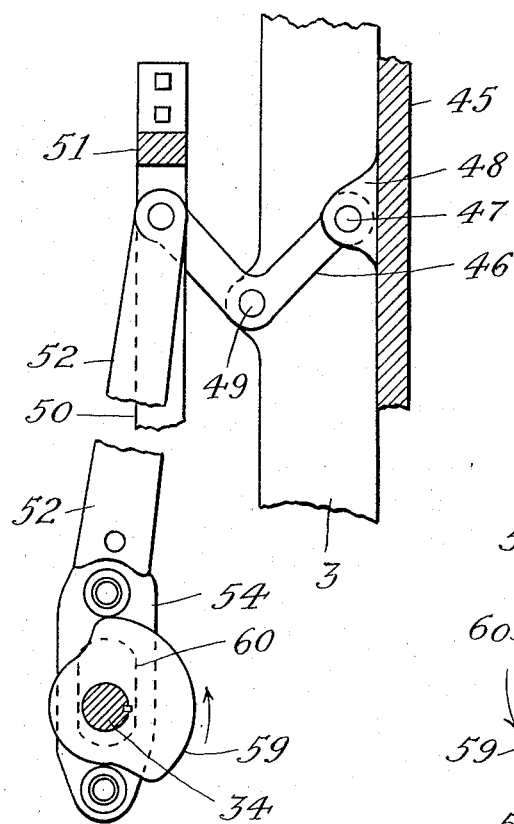
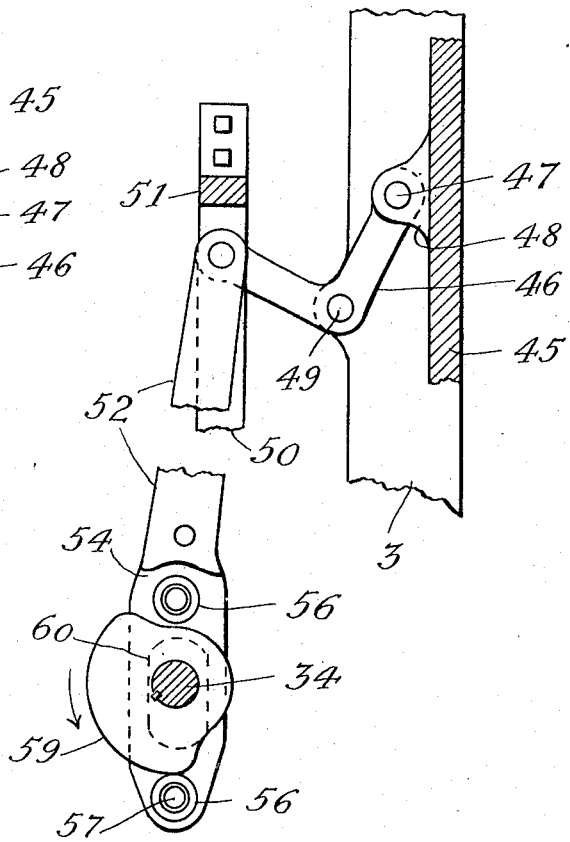
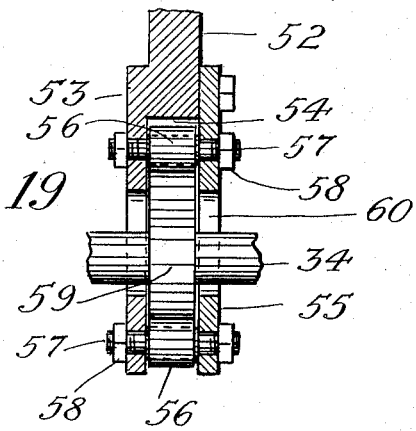
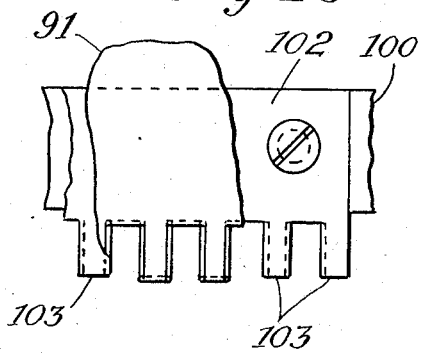
Witnesses:
Inventor,
John E. Erickson.
By P. H. Gunckel
his Attorney.

No. 851,123. PATENTED APR. 23, 1907.
J. E. ERICKSON.
MORTISE AND TENON SAWING MACHINE.
APPLICATION FILED JAN. 4, 1907.
7 SHEETS—SHEET 7.
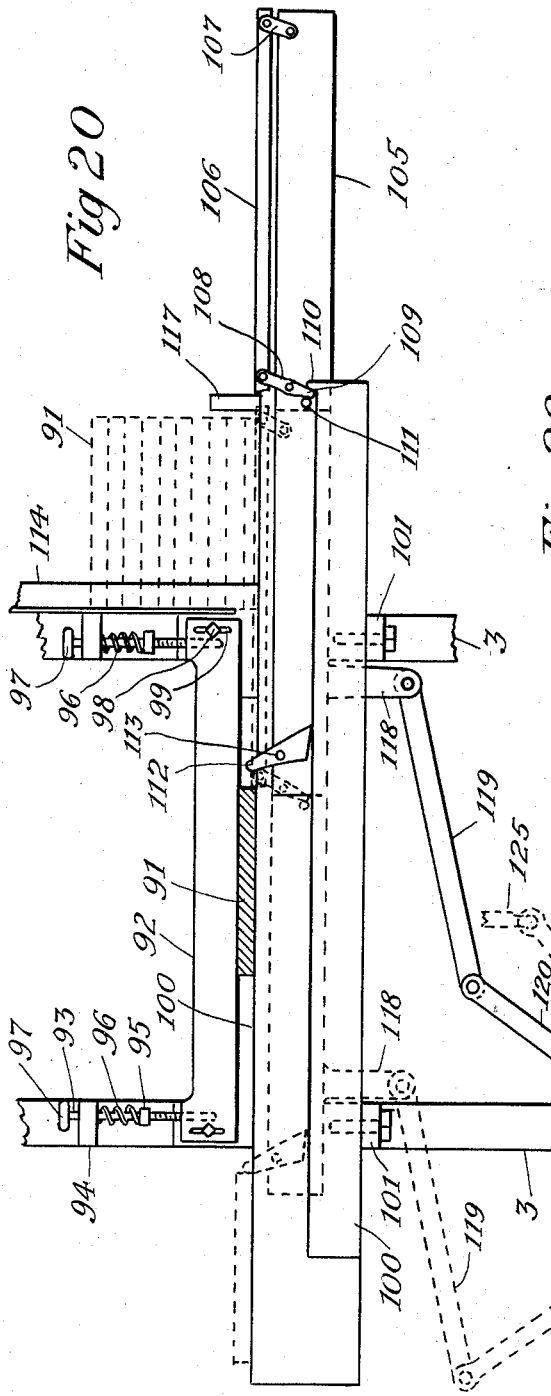
Witnesses:
Inventor
John E. Erickson
By P. H. Gunckel
his Attorney.

UNITED STATES PATENT OFFICE.

JOHN E. ERICKSON, OF ST. PAUL, MINNESOTA.

MORTISE AND TENON SAWING MACHINE.

No. 851,123.  Specification of Letters Patent.  Patented April 23, 1907.

Application filed January 4, 1907. Serial No. 350,806.

*To all whom it may concern:*

Be it known that I, JOHN E. ERICKSON, a citizen of the United States, residing at St. Paul, in the county of Ramsey and State of Minnesota, have invented certain new and useful Improvements in Mortise and Tenon Sawing Machines, of which the following is a specification.

My invention relates to sawing-machines for forming mortises and tenons in the ends of boards for making boxes.

The principal objects of the invention are to produce a machine adapted to employ gangs of reciprocating saws in place of rotary saws or cutters for forming the mortises and tenons; to adapt the machine for use in forming either straight or dovetail mortises and tenons; to adapt the machine for simultaneously sawing both ends of a board; to make it adjustable for operating efficiently upon boards of different lengths; to provide means for the adjustment of the guides for the saw-frames; to provide automatic mechanism for feeding and discharging the boards; and to improve various features of the operating mechanism of the machine.

My improvements are illustrated in the accompanying drawings, in which—

Figure 1:
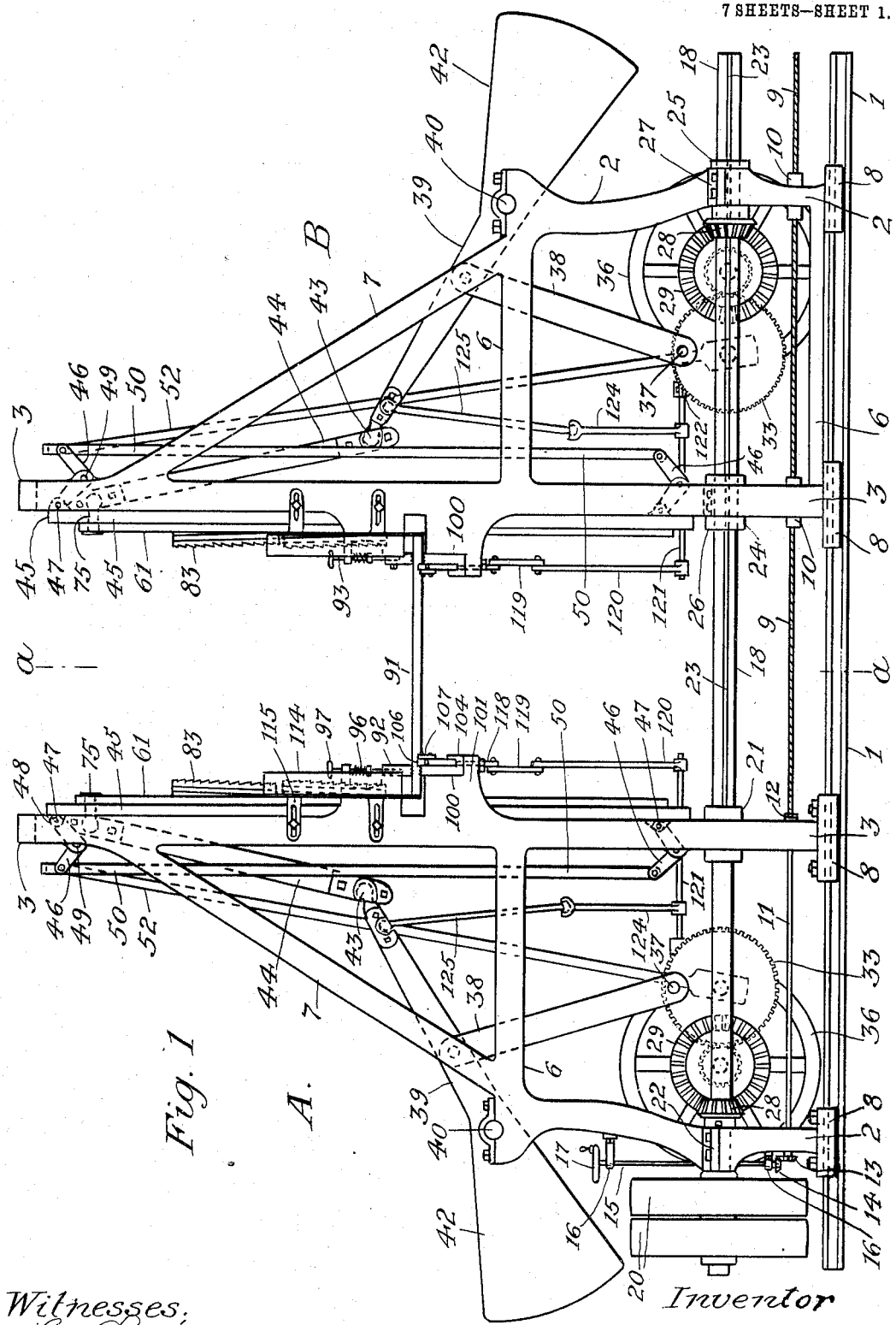
Figure 2:
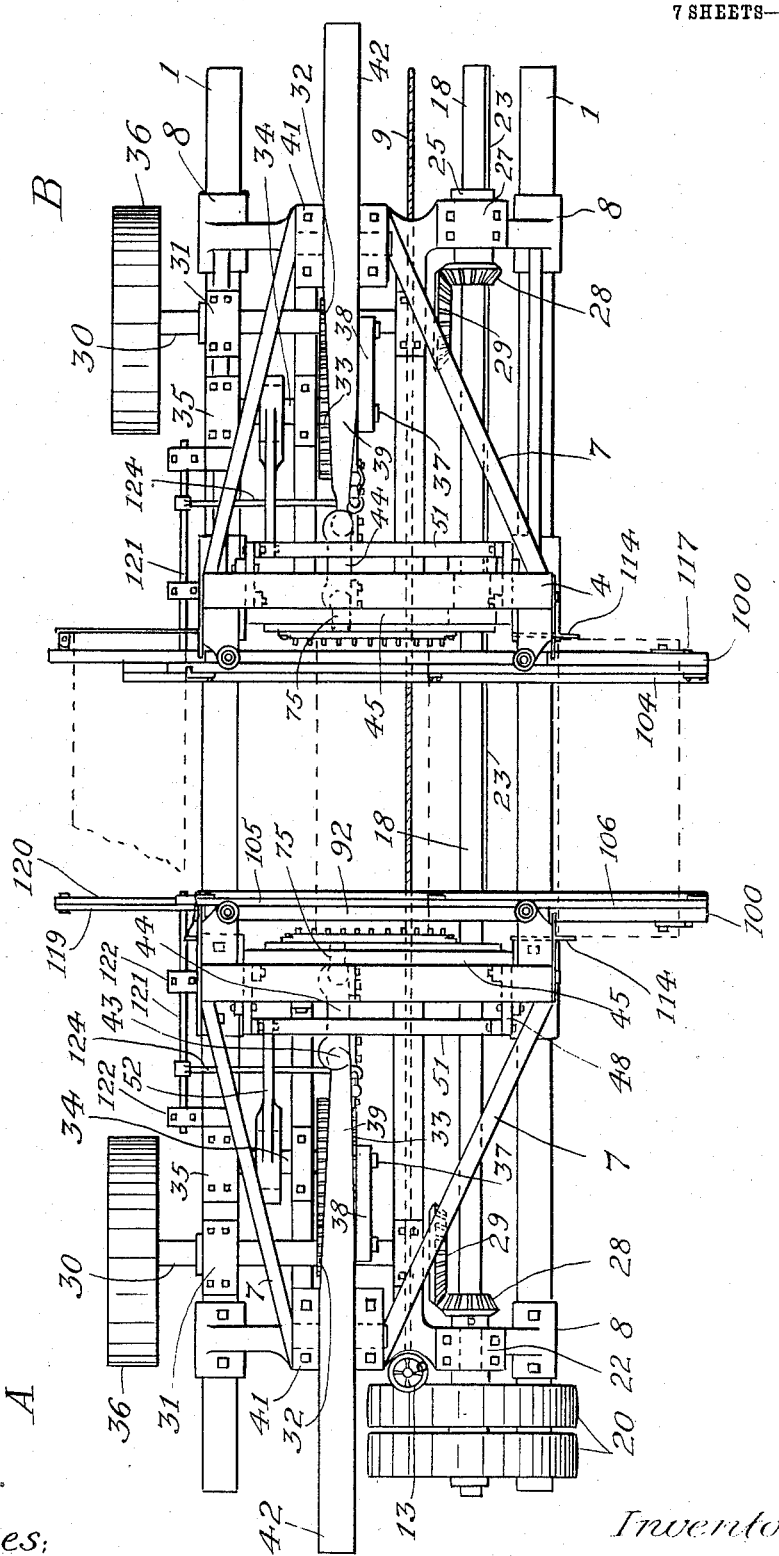

Figure 1 is a front elevation of a sawing-machine embodying my improvements; Fig. 2 is a plan view of the same; Fig. 3 is an end elevation, viewed from the left of Fig. 1 or 2; Fig. 4 is a sectional elevation on the line $a$–$a$ of Fig. 1, showing the saws arranged for cutting dovetail mortises; Figs. 5 and 6 show horizontal sections on the lines $b$–$b$, and $c$–$c$, respectively, of Fig. 4, showing the upper gang of saws; Figs. 7 and 8 are similar views of the lower gang of saws on the lines $d$–$d$ and $e$–$e$, respectively, of Fig. 4; Fig. 9 shows the dovetail mortises as cut by the saws arranged as shown in Figs. 4 to 8; Fig. 10 is a view similar to Fig. 4, but showing the saws arranged for cutting the dovetail tenons adapted to fit the mortises shown in Fig. 9; Fig. 11 shows in elevation the sash guides arranged for the saws when in the positions shown in Fig. 10; Fig. 12 shows the tenons cut by the saws when so arranged; Fig. 13 is an elevation of the saw-sash and saws when arranged for cutting straight mortises and tenons; Figs. 14 and 15 are, respectively, vertical and cross-sections on the lines $f$–$f$ and $g$–$g$ of Fig. 13; Fig. 16 shows the form of the mortises and tenons cut by the saws arranged as in Figs. 13 to 15; Figs. 17, 18, and 19 show details of the devices for reciprocating the saws; Figs. 20 and 21 show detached views of the devices for feeding and discharging the boards; Fig. 22 is a cross-section on the line $h$–$h$ of Fig. 10; and Fig. 23 is a detached view of the plate for supporting the tenons.

In the drawings the base of the machine is shown as consisting of two parallel T-shaped bars or rails designated 1. The superstructure comprises two main frame portions one of which is fixed and the other slidable on the rails toward or away from the stationary member. The two main frames, indicated respectively by A and B, are practically identical in structure and each consists of a pair of short posts 2, a pair of longer posts 3, cross-pieces 4 and 5 respectively connecting the posts 2 and 3, and longitudinal and inclined bars 6 and 7 connecting the posts 2 to the posts 3. On the bases of the posts are grooved slides 8 which fit on the rails 1, and these slides for the frame A are bolted to the rails; while those of the frame B are loose and movable on the rails. The object of this construction is to enable an operator to vary the space between the frames to adapt the machine for sawing boards of different widths. Such adjustment is effected by means of a screw 9 extending lengthwise of the base and engaging in sleeves 10 attached to the movable frame B. The unthreaded portion, or shank, 11 of the screw-rod is mounted in boxes 12 provided on the stationary frame, and on its end is a miter-gear 13 in mesh with a like gear 14 on the end of an upright rod 15, which is supported in eyes 16. By turning the hand-wheel 17 on the end of the rod 15 the screw 9 can be operated to move the frame B in either direction on the tracks.

The main-shaft 18 extends parallel with the rails 1 and is driven by a belt 19 on one of the pulleys 20. The shaft is mounted in journaled boxes 21 and 22 on cross-pieces of the frame A. Its extended portion is provided with a spline 23 and carries slidable collars 24 and 25 which are journaled in boxes 26 and 27 on cross-pieces of the frame B. The power for operating the saws is transmitted from the main-shaft by bevel pinions 28, one of which is keyed to the shaft adjacent to the box 21 and the other to the collar 25; and these pinions mesh with gears 29 on shafts 30 that are mounted in boxes 31 on the frames. On each shaft 30 is a pinion 32 that meshes with a gear-wheel 33 on a stub-shaft 34 that is journaled in boxes 35 on members of the frame; and each shaft 30 has on its outer end a fly-wheel 36.

To give reciprocatory movements to the saws the gear-wheels 33 are provided with pins 37 to which are connected crank-rods 38 which in turn are pivotally connected to oscillatory levers 39. These levers have their fulcrum bearings 40 in boxes 41 on cross-pieces connecting the posts 2, and have weighted arms 42 extending beyond the fulcrums for counterbalancing the weight of the parts operated by the levers. The upper arms of the levers 39 are connected by ball-and-socket joints 43 to the pitmen 44 that reciprocate the sash-frames.

The saw-carrying devices are mounted on the posts 3. A plate 45 is suspended near its upper and lower ends between the pair of the posts 3 of each frame by means of bell-crank levers 46 that are pivotally connected at 47 to lugs 48 on the plate, and fulcrumed at 49 to lugs on the posts. An upright bar 50 is pivoted to the outer ends of each pair of the levers 46 that are in vertical alinement, and a cross-bar 51 is secured to these bars near their upper ends. To the cross-bar 51 is attached the end of a reciprocating lifting-bar 52 for rocking the levers 46 to move the plate 45 horizontally forth and back. The lower portion 53 of the bar 52 forms part of a box which loosely embraces the stub-shaft 34. This part 53 is recessed, as shown at 54, and a plate 55 is bolted to its side to cover the recess. In the upper and lower portions of the recess of the box thus formed are rollers 56 on spindles 57 that are secured by nuts 58; and in the middle portion of the recess is a cam or wiper 59 carried by the stub-shaft 34. In the part 53 and the plate 56 are vertically elongated slots 60 to permit up and down movements of the lifting-bar. The revolutions of the cam cause its broader portion to alternately engage the upper and lower rollers 56 and thus alternately raise and lower the bar 52, and thereby reciprocate the bars 50 to rock the arms 46 on their fulcrums and thus cause the plate 45 to move forth and back intermittently. The purpose of such movements of the plate is to place the saws in working position for the downward stroke and retract them from the kerfs for the upward stroke.

On the face of the plate 45 are adjustably secured the sash-frame guides. These guides consist of an upper plate 61 and a lower plate 62 provided with suitable guide-ways 63 for directing the reciprocations of the sash-frames. On the edges of the plates are ears 64 having elongated slots 65 adapted to loosely receive screws 66 that are fast to the plate 45, and nuts 67 on the screws hold the guide-plates in positions of adjustment on the plate 45. To facilitate the adjusting movements of the plates a threaded rod 68 engages a nut 69 swiveled on the upper portion of the guide-plate 61 and the lower portion of the guide-plate 62 and the screw extends through a stud 70 on the plate 34 and its end is provided with an operating handle 71. The lower end of the plate 61 and the upper end of the plate 62 are pivoted to a stud 72 on the supporting plate 45, so that they may be turned thereon in vertical planes. This construction enables the guide-plates to be adjusted to various inclinations or to vertical alinement.

To provide space for the operation of the pitman 44 the plate 45 has a vertically elongated opening 73; and the upper sash-frame guide plate 61 is provided with a longitudinal slot 74. The former opening permits lateral movement of the pitman, while the walls of the latter opening serve as guides for the reciprocatory movements of the pitman pin 75, which is connected to the upper saw carrier.

The saw-sashes 76 are secured respectively to upper and lower plates or carriers 77 and 78, and these carriers are arranged to reciprocate in and be guided by the guide-ways 63. The sash or gates are secured to their carriers by bolts 79 engaging lateral ears 80 on the sash-frames and entering the carrier plates. By means of such connection of the sash to the carrier it may be adjusted and the line of the cutting edges of the saws may be inclined from a vertical plane to determine the depth of the kerfs or mortises they cut in the board, as indicated in Fig. 14. The carrier plates 77 and 78 are connected by pivots 81 to a rod 82 so as to be reciprocated in unison by the pitman.

The saws 83, preparatory to being put in the sash, are assembled, together with the intermediate spacing-strips 84, and the saws and strips of a group for a sash are clamped together by a pair of bolts 85, and the group is then placed in the sash and secured thereto by bolts 86 which also pass through holes in the saws and spacing-strips. The saws are preferably arranged with their teeth in horizontal alinement, as shown, to facilitate the operation of sharpening them. In this way, as will be apparent, a gang of saws can readily be placed in its sash and removed; and it will be obvious that in the assembling of the parts the spacing of the saws can be regulated by the thickness of the spacing-strips 84 employed; and, also, that the saw blades may be set at right angles or at any desired lateral inclination to the sash. To enable the saws to be thus inclined it is only necessary to have the inner walls of the sash sides cut away to the required inclinations, as shown at 87. When inclined saws are employed the cutting edges of their teeth should be properly beveled so as to be presented in a common plane.

For cutting straight mortises and tenons 88 the saws would be set at right angles to the sash, as shown in Figs. 13, 14, and 15; for cutting the dovetail mortises 89 the saws in the upper and lower sash should be inclined laterally in opposite directions, as indicated in Figs. 5 to 8; and in both instances the upper and lower saws should be operated in vertical planes, as indicated in Fig. 4. For cutting the tenons 90 to fit the mortises 89 the upper and lower saws should be arranged in the sash as in cutting the dovetail mortises but the sash should be made to work in oppositely inclined directions, as indicated in Figs. 10 and 11.

The boards, 91, to be operated upon may be presented to the saws and removed in any suitable way, but I prefer to feed and discharge them automatically by mechanism actuated by the operating devices of the sawing-machines, so as to make the operation of the machine as a whole automatic in its character. The particular mechanism for accomplishing this end I propose to present more fully in another application, and therefore I have shown in the drawings of the present application only so much of mechanism as seemed necessary for the purposes of this case, and will now describe the main features thereof.

On the pair of posts 3 of the respective machine parts A and B is secured a board-clamp 92 which serves to press the board downward on the support hereafter described. The bar 92 is suspended by rods 93 in brackets 94 on the posts 3 and which are connected to the opposite ends of the bar. These rods are provided with collars 95 and with coil-springs 96 exerting pressure between the brackets and the collars and thereby pressing the bar downward. The rods are threaded and screwed into the bars by means of handwheels 97, for adjusting the clamp toward or away from the board-supports to accommodate for boards of different thickness. The clamp-bar movements are guided by means of pins 98 and slots 99.

A support for each end of the board is provided beneath the clamp by a shelf 100 attached to brackets 101 on the posts 3. To each shelf 100 is secured a plate 102 having tongues 103 extending under the board in position to support the tenons or uncut portions of the board to prevent them from being broken off by the action of the saws.

For directing the board to position to be sawed and removing it, guide-ways 104 are formed on the shelves 100 and extend through the machine and project somewhat at the front and rear. A reciprocating board-carrier 105 is arranged in each guide-way and is provided with a device 106 for engaging the edge of the board to move it along the ways to the sawing point, and then, after the board has been sawed, to push it out of the rear of the machine. This device 106 consists of a bar pivotally connected at its ends to the carrier 105 by links 107 and 108 which permit it to be raised and lowered from and to the upper surface of the carrier. The link 108 has a downward extension 109 which contacts with a lug 110 on the outer portion of the shelf to lift the bar 106 when the carriage is moved outward. The link extension 109 is engaged at its rear side by a pin 111 on the carrier which serves to prevent the bar 106 from swinging outward when the arm 109 strikes the lug 110, and which serves also to hold the bar in its elevated position while carrying the board inward to the saws. This carrier bar 106 serves to feed the board inward only to the sawing point; that is to the middle of the machine.

On the inner end of the carrier 105 is a dog 112, pivoted at 113 to the carrier and having its lower portion weighted, so that it may swing and gravitate to nearly upright position when free. The dog is so located that it will stand in front of the edge of the board that is being sawed and be in position to carry the board toward the rear of the machine when the carrier is moved inward to feed another board to position to be sawed. Then when the carrier is retracted the upper portion of the dog will engage the under surface of the board at the sawing point and be swung on its pivot until it has passed the board and then will again swing on its pivot to operative position.

The boards may be placed singly on the shelves in position to be engaged by the carrier, but it is preferable to pile them and allow the carrier bars 106 to engage and move the under board of the pile, as is indicated in the drawings. For properly piling and guiding the boards vertical standards or guides 114 having slotted ears 115 are adjustably attached to the posts 3 by means of bolts 116; and other adjustable standards 117 are provided on the shelves 100.

The board-carriers are operated in the following manner. To a depending bracket 118 on the carrier near its rear end is pivoted one end of a rod 119 the other end of which is pivoted to a rod 120. The lower end of the latter rod is made fast to a rock-shaft 121 that is journaled in boxes 122 on brackets 123 provided on the machine frame. To the rock-shaft is also attached a rod 124 the upper end of which is pivotally connected to another rod 125 which in turn is pivotally connected to the upper portion of the rocking-lever 39. The oscillatory movements of the lever 39 serve to rock the shaft 121 and thereby swing the rods 120 and 119 transversely of the machine and thus reciprocate the board-carrier inward and outward. The inward movement of the carrier for feeding a board to position to be sawed takes place while the saws are being moved upward by the operation of the lever 39; and the outward movement of the carrier for placing it in position to feed another board is effected by the downward movement of the lever 39 for operatively reciprocating the saws.

In operating the machine the plate 45 remains stationary in the position shown in Fig. 17 during the downward reciprocation of the sash-frame, so that the movement of the latter is in a vertical plane parallel with the face of the plate. Upon completion of such movement and during the return reciprocation the operation of the cam 59 withdraws the saws from the kerfs by retracting the plate 45 to the position shown in Fig. 18. While the saws are on the up-stroke the board-carrier feeds in a board to the sawing point between the shelves 100 and the clamp 92 to be operated upon by the next down-stroke of the saws. During the down-stroke of the saws the carrier is moved outward to pick up another board from the pile and upon completion of the sawing the saws again recede from the kerfs and are moved upward and while they are so moving the carrier pushes the sawed board rearward and presents another board in position to be sawed.

To saw dovetail mortises and tenons it is only necessary to properly adjust the positions of the frame-guides 61 and 62. For sawing straight mortises and tenons it is necessary to substitute saws set at right angles to their frames.

Having described my invention, what I claim and desire to secure by Letters Patent is—

1. In a machine for sawing mortises and tenons, the combination with means for holding a board stationary, of a saw-sash, a carrier therefor, a gang of saws held by the sash, means for offsetting the sash with respect to its carrier to determine the depth of the saw-kerfs, and means for reciprocating the carrier, substantially as set forth.

2. In a machine for sawing mortises and tenons, the combination with means for holding a board stationary, of a saw-sash, a carrier therefor, a gang of saws held by the sash, means for offsetting the sash with respect to its carrier to determine the depth of the saw-kerfs, means for reciprocating the carrier, and means for causing the carrier to recede laterally on the up-stroke to free the saws from the kerfs, substantially as set forth.

3. In a machine for sawing mortises and tenons, the combination with means for holding a board stationary, of a saw-sash, a carrier therefor, a gang of saws held by the sash, means for offsetting the sash with respect to its carrier to determine the depth of the saw-kerfs, laterally adjustable guides for the carrier, means for reciprocating the carrier in its guides, and means for causing the carrier to recede laterally on the up-stroke to free the saws from the kerfs, substantially as set forth.

4. In a machine for sawing mortises and tenons, a work-holder for holding a board stationary, a sash carrier, a gang of saws and a sash therefor offset with respect to the carrier, means for moving the carrier downward in a vertical plane, means for causing it to recede horizontally for the upward movement, and means for feeding a board to and removing it from the work-holder, substantially as set forth.

5. In a machine of the class described, a saw-sash, a gang of saws set therein with the sides of the blades inclined toward one side of the sash, and means for reciprocating the sash downward in a vertical plane, substantially as set forth.

6. In a machine of the class described, upper and lower saw-sashes, gangs of saws set therein with the sides of the blades of the two gangs inclined toward opposite sides of their respective sashes, and means for reciprocating the sashes downward in a vertical plane, substantially as set forth.

7. In a machine of the class described, upper and lower saw-sashes, gangs of saws set therein with the sides of the blades of the two gangs inclined toward opposite sides of their respective sashes, and means for reciprocating the sashes downward in oppositely inclined directions on a vertical plane, substantially as set forth.

8. In a machine of the class described, the combination with means for holding a board stationary, of opposite pairs of gangs of saws, means for reciprocating and guiding them to simultaneously cut the opposite ends of the board, and means for causing the saws to recede from the kerfs, substantially as set forth.

9. The combination with a saw-sash, of a gang of saws, a series of intermediate spacing strips, bolts for clamping them together, and means for detachably connecting the assembled saws and strips to the sash, substantially as set forth.

10. The combination with a saw-sash, of a gang of saws, a series of intermediate spacing strips, bolts for clamping them together, means for detachably connecting the assembled saws and strips to the sash, a sash-carrier, and means for adjustably attaching the sash to the carrier to regulate the depth of the kerfs to be cut, substantially as set forth.

In testimony whereof I have signed my name to this specification in the presence of two subscribing witnesses this 22d day of December, 1906.

JOHN E. ERICKSON.

Witnesses:
P. H. GUNCKEL.
H. A. BOWMAN.